(12) United States Patent
Moriyama

(10) Patent No.: US 10,565,414 B2
(45) Date of Patent: Feb. 18, 2020

(54) BARCODE READING DEVICE, CONTROL METHOD AND COMPUTER-READABLE STORAGE MEDIUM

(71) Applicant: CASIO COMPUTER CO., LTD., Shibuya-ku, Tokyo (JP)

(72) Inventor: Teppei Moriyama, Hino (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/051,636

(22) Filed: Aug. 1, 2018

(65) Prior Publication Data

US 2019/0050609 A1 Feb. 14, 2019

(30) Foreign Application Priority Data

Aug. 10, 2017 (JP) .................................. 2017-155843

(51) Int. Cl.
*G06K 9/24* (2006.01)
*G06K 7/10* (2006.01)
*G06T 1/00* (2006.01)

(52) U.S. Cl.
CPC ....... *G06K 7/1095* (2013.01); *G06K 7/10722* (2013.01); *G06K 7/10881* (2013.01); *G06T 1/0007* (2013.01); *G06K 2207/1011* (2013.01)

(58) Field of Classification Search
USPC ....................................... 235/462.01–462.49
See application file for complete search history.

(56) References Cited

U.S. PATENT DOCUMENTS

| 5,414,251 A * | 5/1995 | Durbin .............. G06K 7/10722 235/462.11 |
|---|---|---|
| 9,633,245 B2 | 4/2017 | Kawashima et al. |
| 2012/0199655 A1 | 8/2012 | Fukuba |
| 2012/0248184 A1 | 10/2012 | Naito |
| 2013/0329123 A1 | 12/2013 | Hakata et al. |

FOREIGN PATENT DOCUMENTS

| JP | H11345278 A | 12/1999 |
|---|---|---|
| JP | 2000322505 A | 11/2000 |
| JP | 2004345826 A | 12/2004 |
| JP | 2005275530 A | 10/2005 |
| JP | 2007207010 A | 8/2007 |
| JP | 2011101075 A | 5/2011 |
| JP | 2014127105 A | 7/2014 |

OTHER PUBLICATIONS

Related U.S. Appl. No. 16/129,750; First Named Inventor: Yasuaki Ogawa Title: "Barcode Reading Device, Imaging Method and Computer-Readable Storage Medium"; filed Sep. 12, 2018.
Japanese Office Action dated Sep. 9, 2019 (and English translation thereof) issued in Japanese Patent Application No. JP 2017-155843.

* cited by examiner

*Primary Examiner* — Jamara A Franklin
(74) *Attorney, Agent, or Firm* — Holtz, Holtz & Volek PC

(57) ABSTRACT

A barcode reading device including a barcode scanner which irradiates a target with a light beam and reads a barcode provided to the target, a camera which captures an image of the target, a display which sequentially displays images captured by the camera, and a processor which performs indicator display control processing of causing an indicator indicating an assumed irradiation position of the light beam to be displayed on the display while being superimposed on the captured image when the barcode is read by the barcode scanner.

17 Claims, 7 Drawing Sheets

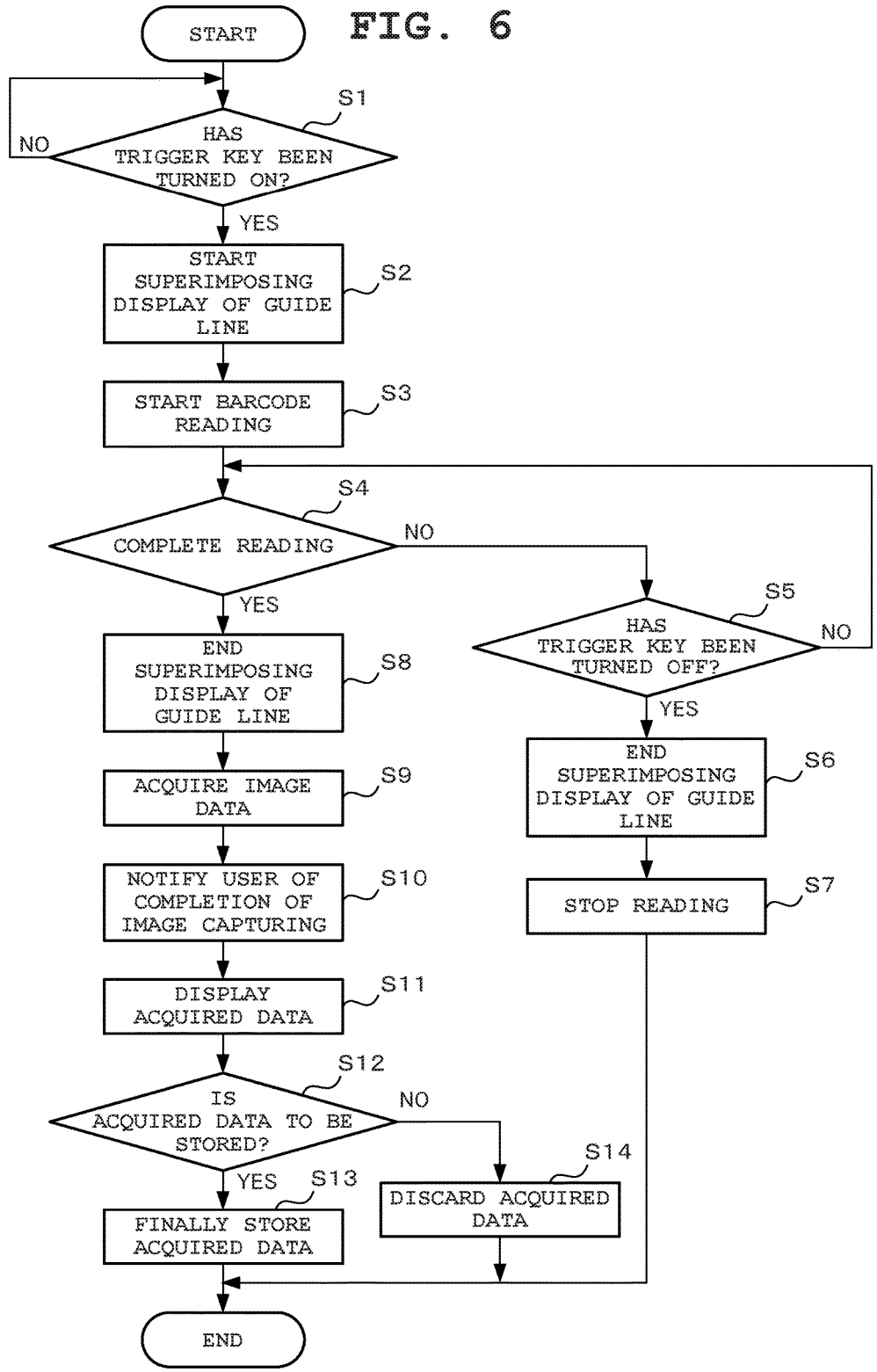

BARCODE READING DEVICE, CONTROL METHOD AND COMPUTER-READABLE STORAGE MEDIUM

CROSS-REFERENCE TO RELATED APPLICATION

This application is based upon and claims the benefit of priority from the prior Japanese Patent Application No. 2017-155843 filed Aug. 10, 2017, the entire contents of which are incorporated herein by reference.

BACKGROUND OF THE INVENTION

1. Field of the Invention

The present invention relates to a barcode reading device, a control method and a computer-readable storage medium.

2. Description of the Related Art

Conventionally, handy terminals which read barcodes affixed to various sale slips, articles, and the like by a laser scanner have been heavily used. Also, for example. Japanese Patent Application Laid-Open (Kokai) Publication No. 2004-345826 discloses a structure in which a camera and a display which displays an image captured by the camera are provided to the main body of a handy terminal so as not only to read a barcode but also to capture an image of a sales slip, article, or the like to which the barcode has been affixed. With this structure, by setting a laser light emitting direction and an imaging direction such that they are substantially parallel to each other, the user can efficiently perform a barcode reading operation and an imaging operation while checking an image of a sales slip, article, or the like on the screen of the display.

SUMMARY OF THE INVENTION

In accordance with one aspect of the present invention, there is provided a barcode reading device comprising: a barcode scanner which irradiates a target with a light beam and reads a barcode provided to the target; a camera which captures an image of the target; a display which sequentially displays images captured by the camera; and a processor which performs indicator display control processing of causing an indicator indicating an assumed irradiation position of the light beam to be displayed on the display while being superimposed on the captured image when the barcode is read by the barcode scanner.

In accordance with another aspect of the present invention, there is provided a control method for a barcode reading device including a barcode scanner which irradiates a target with a light beam and reads a barcode provided to the target, a camera which captures an image of the target, a display which sequentially displays images captured by the camera, and a processor, comprising: an indicator display control step of causing an indicator indicating an assumed irradiation position of the light beam to be displayed on the display while being superimposed on the captured image when the barcode is read by the barcode scanner.

In accordance with another aspect of the present invention, there is provided a non-transitory computer-readable storage medium having stored thereon a program that is executable by a computer of a barcode reading device including a barcode scanner which irradiates a target with a light beam and reads a barcode provided to the target, a camera which captures an image of the target, a display which sequentially displays images captured by the camera, and a processor, the program being executable by the computer to actualize functions comprising: indicator display control processing for causing an indicator indicating an assumed irradiation position of the light beam to be displayed on the display while being superimposed on the captured image when the barcode is read by the barcode scanner.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a flowchart of operations in a simultaneous read mode; and

DETAILED DESCRIPTION OF THE PREFERRED EMBODIMENTS

Figure 1:
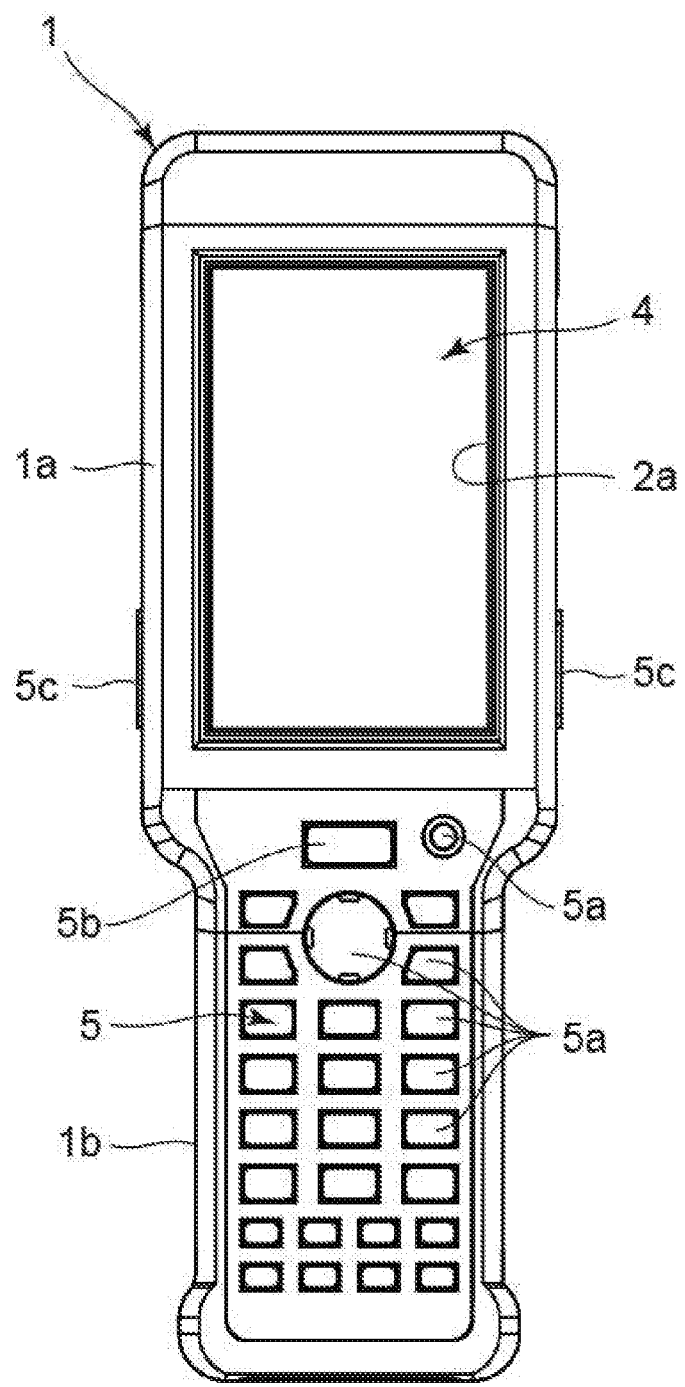
FIG. 1 is a front view of an embodiment of a handy terminal according to the present invention.
Figure 2:
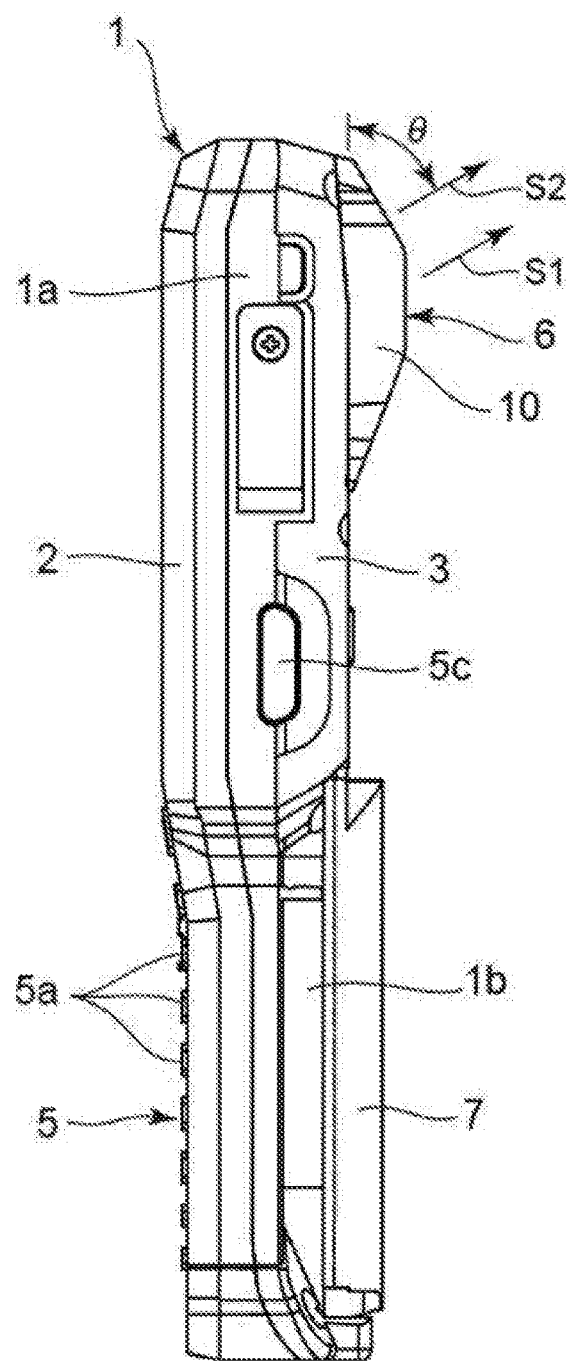
FIG. 2 is a side view of the handy terminal.
Figure 3:
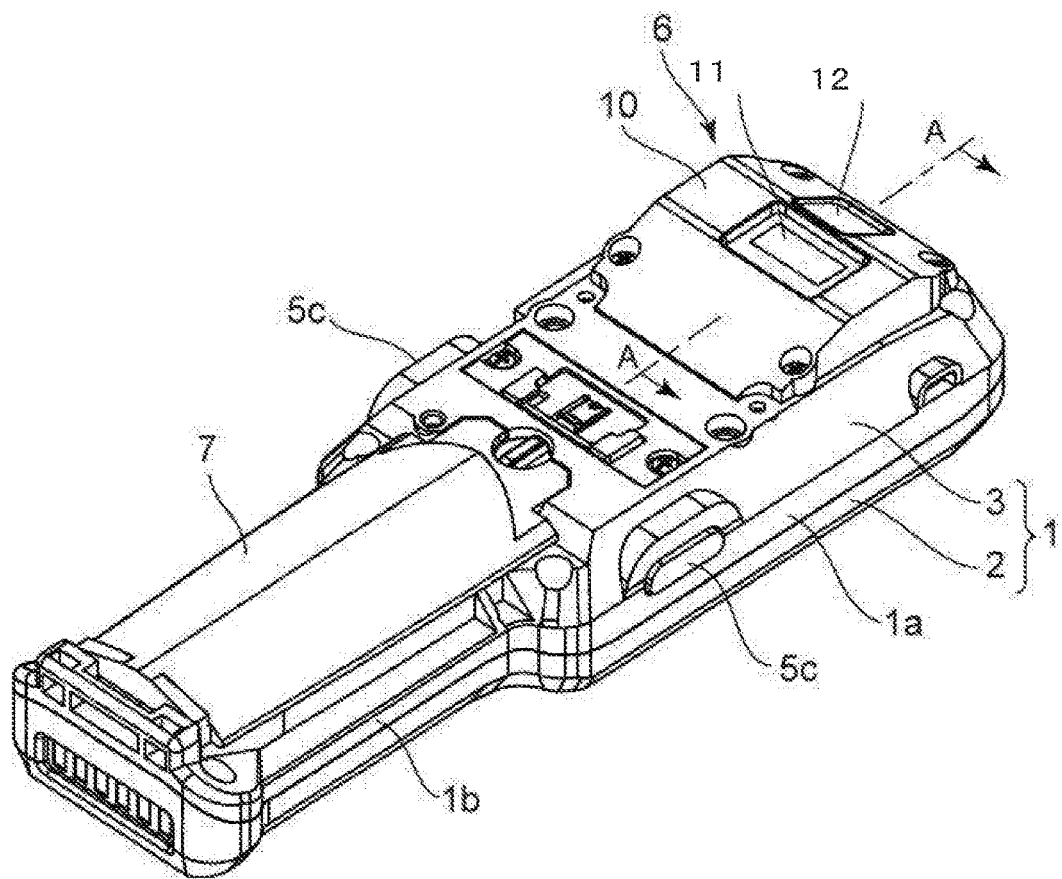
FIG. 3 is a perspective view of the rear surface side of the handy terminal.

An embodiment of the present invention will hereinafter be described. FIG. 1 to FIG. 3 show a handy terminal according to an embodiment of the present invention.

This handy terminal includes an imaging function of capturing an image of a target such as various sales slips and articles provided with a barcode, and includes a device case 1, as shown in FIG. 1 to FIG. 3. This device case 1 is constituted by an upper case 2 and a lower case 3. The upper case 2 is provided with a display 4 and an input section 5. The lower case 3 is provided with a reading device 6 and a battery cover 7.

In the device case 1, a main body section 1a in a rectangular shape elongated in a front-and-back direction (vertical direction in FIG. 1) is formed on a tip side (upper side in FIG. 1) positioned on the display 4 side of the upper case 2 and its corresponding reading device 6 side of the lower case 3, a grip section 1b in a rectangular shape elongated in the front-and-back direction is formed on the frontward side (lower side in FIG. 1) positioned on the input section 5 side of the upper case 2 and its corresponding battery cover 7 side of the lower case 3. Also, in the device case 1, the width of the grip section 1b is narrower than the width of the main body section 1a, and the device case 1 is formed in a substantially Japanese battledore shape as a whole.

As shown in FIG. 1, the input section 5 includes various keys 5a such as numeric keys, arithmetic keys, cursor keys, an enter key, and a power supply key, which are arrayed on the upper case 2 positioned on the grip section 1b side. On the upper side of the input section 5, a center trigger key 5b is provided. On both side surfaces of the device case 1, side trigger keys 5c are provided.

The reading device 6 is constituted by a scanner and a camera provided inside a unit case 10 provided on the lower surface (upper surface in FIG. 3) of the lower case 3 corresponding to the rear surface side of the display 4. The unit case 10 is provided with a read window section 11 corresponding to the scanner and an imaging window section 12 corresponding to the camera.

The scanner of the reading device 6 is a general device which irradiates a target with laser light via the read window section 11, reads a barcode by receiving reflected light of the laser light while moving its irradiation position to a predetermined direction in a reciprocating manner, and acquires code data. The camera of the reading device 6 captures an image of the target by an image sensor via the imaging window section 12, and the image of the target or the like captured by the camera is displayed on the display 4.

Here, the handy terminal is structured such that an irradiation direction S1 of laser light and an imaging direction S2 of the camera in the reading device 6 are set to be in the same direction as shown in FIG. 2 and the light trail of the laser light reciprocating at the time of barcode reading traverses an imaging range of the camera at a predetermined position.

Figure 4:
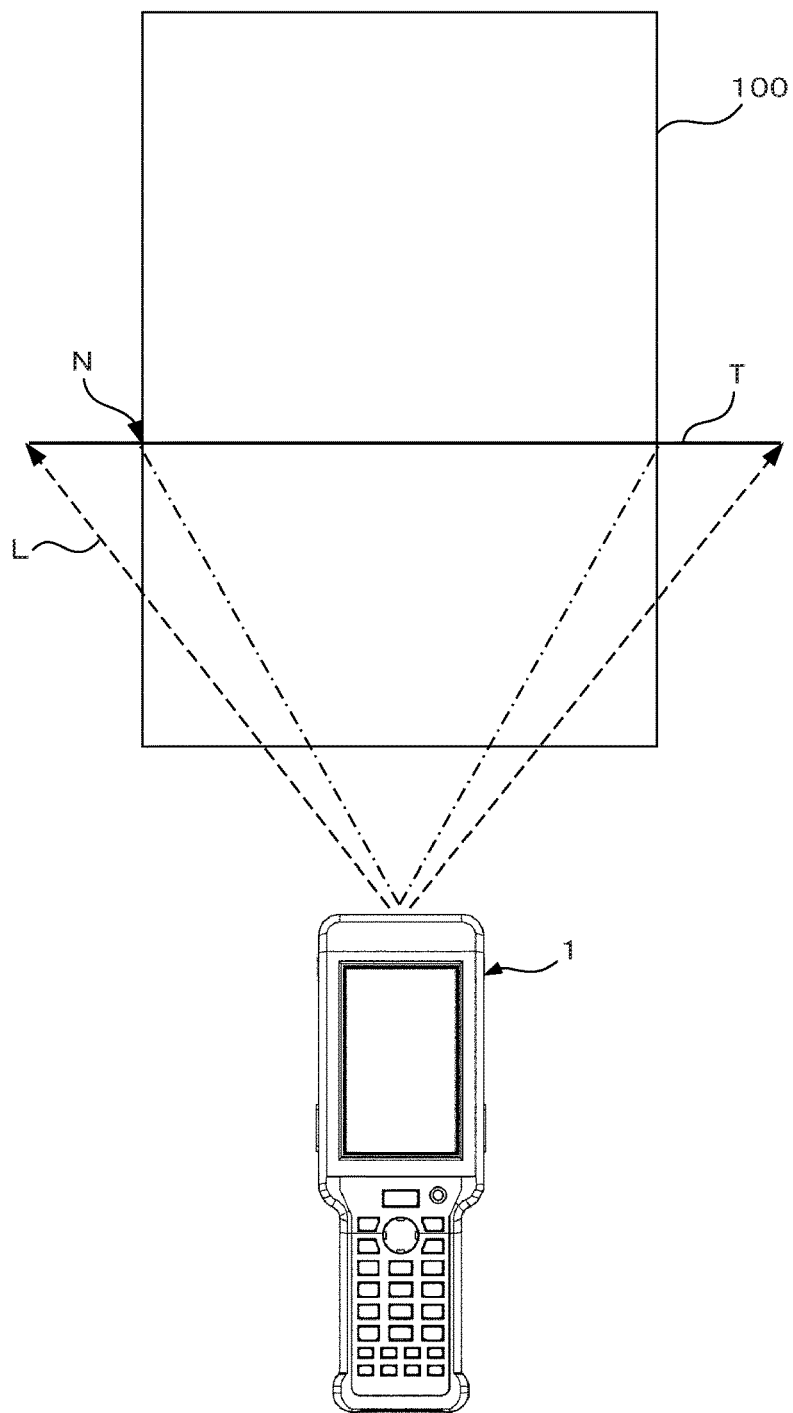
FIG. 4 is a diagram of a relation between the light trail of laser light and the imaging range of a camera at the time of barcode reading.

FIG. 4 is a diagram of a relation between the light trail of laser light L and the imaging range 100 of the camera at the time of barcode reading. In the present embodiment, the imaging range 100 of the camera is in a longitudinally-elongated rectangular shape, the moving direction of the laser light L is a lateral direction, and its light trail T crosses the imaging range 100 at a position slightly lower than the center of the imaging range 100. Also, a crossing position N of the light trail T, that is, the position in the imaging range 100 in the vertical direction is constant.

Also, the irradiation direction S1 of the laser light L and the imaging direction S2 of the camera keep a gradient at a predetermined angle θ with respect to the lower surface of the device case 1, that is, the lower surface of the lower case 3. The handy terminal is structured such that a user (worker) can easily perform a barcode reading operation and a target imaging operation while viewing the display 4. The predetermined angle θ is in an angle range of 40 degrees to 80 degrees, and should preferably be at 60 degrees toward the tip side (upper side in FIG. 2) of the lower case 3.

Figure 5:
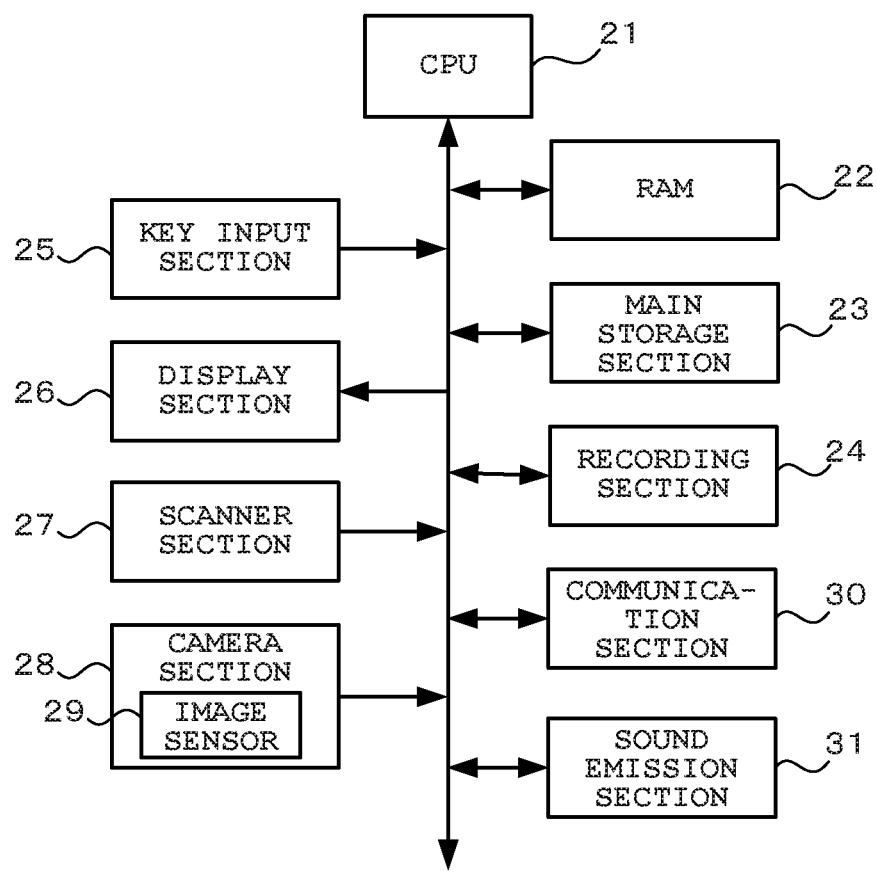
FIG. 5 is a block diagram of an electrical structure of the handy terminal.

FIG. 5 is a schematic block diagram of an electrical structure of the handy terminal. The handy terminal is constituted by a CPU (Central Processing Unit) 21, a RAM (Random Access Memory) 22 connected to the CPU 21, a main storage section 23, a storage section 24, a key input section 25, a display section 26, a scanner section 27, a camera section 28, a communication section 30, and a sound emission section 31.

The main storage section 23 is constituted by a nonvolatile rewritable memory such as a flash memory incorporated in the handy terminal. The main storage section 23 stores a control program, various setting information regarding operations of the handy terminal set by the user, and the like.

The CPU 21 reads the control program from the main storage section 23, develops the control program on the RAM 22, and controls operations of the handy terminal based on the developed control program. Here, the RAM 22 is used as a work memory, and various data including image data are stored in the RAM 22 as required.

The key input section 25, which includes various keys 5a (such as numeric keys, arithmetic keys, cursor keys, enter key, and power supply key), the center trigger key 5b, and the side trigger keys 5c, detects whether these keys have been operated and supplies such operation information to the CPU 21. The display section 26 is constituted by the display 4 and its drive circuit. This display 4 is, for example, an LCD (Liquid Crystal Display) or ELD (Electro Luminescent Display).

The scanner section 27 is a laser scanner module or the like accommodated in the above-described reading device 6, and includes a laser diode which emits the laser light L, a movable mirror which reflects the laser light L and scans a barcode on the surface of an article by rotating within predetermined angles, and a light-emitting element which receives irregular reflected light from the surface of the article. The scanner section 27 includes a laser control circuit which controls the light emission of the laser diode, a mirror drive circuit which drives the movable mirror, an analog signal processing circuit which processes an analog signal outputted from the light-receiving element for A/D conversion, and a decode circuit which decodes a processed digital signal to acquire code data and supplies the code data to the CPU 21.

The camera section 28 is a digital camera module or the like accommodated in the above-described reading device 6, and includes an image sensor 29 which images a subject via an imaging lens containing a focus lens. The image sensor 29 is a CCD (Charge Coupled Device) or CMOS (Complementary Metal Oxide Semiconductor) sensor.

Although not shown, the camera section 28 includes a drive circuit which drives the image sensor 29, an image processing circuit which processes an imaging signal read from the image sensor 29, performs various signal processing such as white balance and brightness adjustment, and supplies the result as image data to the CPU 21, and an AF drive circuit which achieves an AF (Auto Focus) function by driving the imaging lens and performing focus adjustment.

The storage section 24 is constituted by, for example, a memory card attachable to and detachable from the handy terminal and a card interface capable of inputting and outputting data to the memory card. The storage section 24 stores code data acquired by the scanner section 27 and image data generated by the CPU 21 by later-described processing based on image data acquired by the camera section 28 in a manner that the code data and the image data are associated with each other, together with other information.

The communication section 30 communicates with an external information device as required wirelessly or in a wired manner, and transmits code data and image data for each article stored (saved) in the storage section 24 and code data and image data newly acquired during an operation and temporarily stored in the RAM 22 to the external information device. The external information device is, for example, a computer or a data management server for use in management tasks such as those regarding article delivery or inventory.

The sound emission section 31 is constituted by a sound generation circuit, an amplifier, a small-sized loudspeaker, and the like, and outputs various alarm sounds as required, such as key operation sounds during operations on various keys and the side trigger keys 5c of the input section 5 and a buzzer sound described further below.

The above-structured handy terminal has, as an operation mode, a simultaneous read mode for reading a barcode, acquiring code data, automatically capturing an image of a target provided with the barcode, and storing the captured image.

In the following descriptions, operations of the handy terminal when the simultaneous read mode is set by the user are described. Note that, here, a target having a barcode is a sales slip.

FIG. 6 is a flowchart showing main portions of processing to be performed by the CPU 21 following a program stored in the main storage section 23 when the simultaneous read mode is set.

In the handy terminal, when the simultaneous read mode is set, an image of a subject is captured by the camera section 28 at a predetermined frame rate, and each captured image is displayed on the display 4 as a live view image. During this operation, focus adjustment by the AF function is performed in the camera section 28.

Figure 7C:
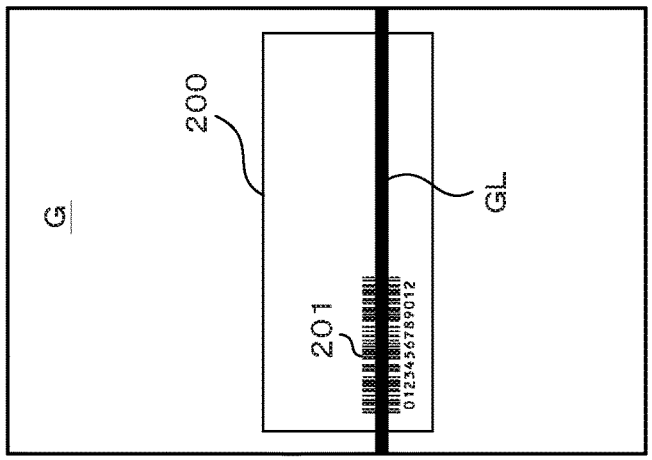
FIG. 7A to FIG. 7C are diagrams each exemplarily showing a display screen of a display at the time of an operation using the simultaneous read mode.

Then, the CPU 21 judges whether the trigger key (center trigger key 5b or any of the side trigger keys 5c) has been pressed by the user (worker) while displaying a live view image on the display 4 (Step S1), as shown in FIG. 6. FIG. 7A is a diagram showing an example of a display screen of the display 4 before the trigger key is pressed by the user. Before the trigger key is pressed, only a live view image G, which is sequentially updated, is displayed. FIG. 7A shows an example in which a part of a sales slip 200 is displayed.

Figure 7B:
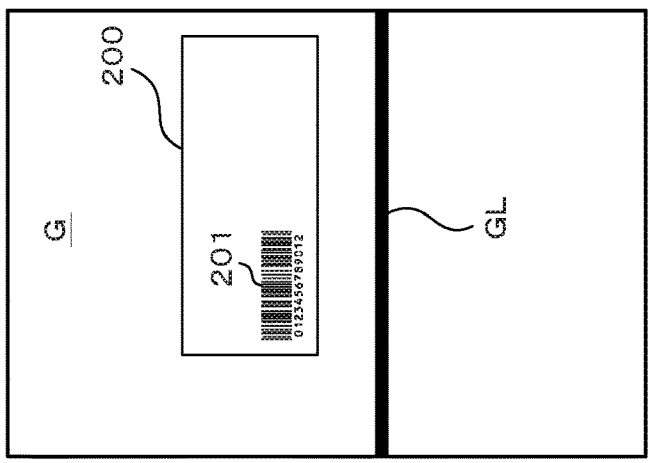
Figure 7A:
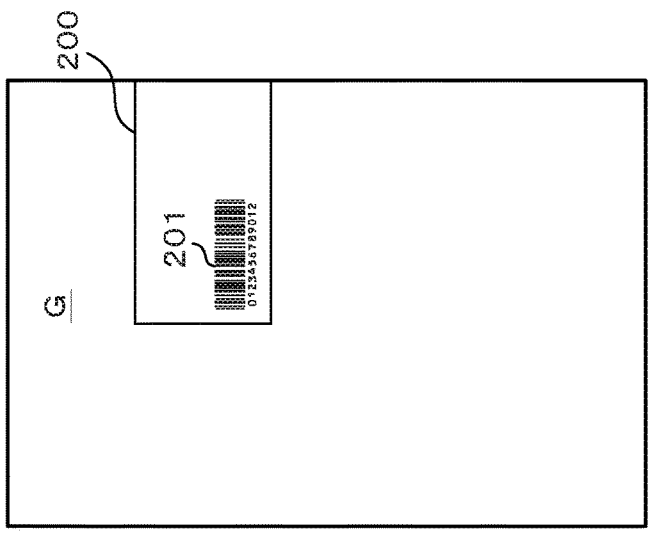

Then, when the trigger key is turned ON by the user (worker), that is, when the trigger key is pressed (YES at Step S1), the CPU 21 starts processing of superimposing a guide line GL on the live view image G (Step S2), as shown in FIG. 7B. FIG. 7B is a diagram exemplarily showing the display screen of the display 4 when the user (worker) adjusts the position and size of the sales slip 200 in the live view image G to some extent and presses the trigger key.

The superimposing display of the guide line GL is performed by the CPU 21 synthesizing line data on image data of each image captured by the camera section 28 and displayed on the display 4 as a live view image.

This guide line GL is an indicator indicating an irradiation position of the laser light L in the imaging range, and is a straight line extending in the lateral direction on the display screen (live view image G) of the display 4. A display position H (position in the vertical direction) of the guide line GL on the display screen is a predetermined position corresponding to the position of the light trail T of the laser light L with respect to the imaging range 100 of the camera shown in FIG. 4. Also, the width (thickness) of the guide line GL is a width determined in advance on condition that the user can easily visually recognize the guide line GL.

Immediately after the guide line GL is started to be displayed, the CPU 21 starts a barcode reading operation by the scanner section 27 (Step S3). That is, the CPU 21 starts an operation of reading the barcode by irradiating with the laser light L and acquiring the code data of the barcode.

Therefore, the barcode can be read when the position and size of the sales slip 200 are adjusted by the user and the guide line GL enters a state of being superimposed on a barcode 201 of the sales slip 200, as shown in FIG. 7C. Note that the guide line GL is only required to be displayed at the time of barcode reading, and the processing of starting the display of the guide line GL and the processing of starting the reading of the barcode 201 may be performed in the inverse order.

Then, the CPU 21 continues the reading operation until the reading of the barcode 201 is completed (NO at Step S4). During this reading operation, when the trigger key enters an OFF state, that is, when the user stops pressing the trigger key (YES at Step S5), the CPU 21 immediately ends the superimposing display of the guide line GL (Step S6), and stops the operation of reading the barcode 201 (Step S7). This causes one processing in the simultaneous read mode to end.

On the other hand, when the trigger key does not enter an OFF state and the operation of reading the barcode 201 is completed by the state shown in FIG. 7C being achieved (YES at Step S4), the CPU 21 next performs the following processing. Note that, although omitted in FIG. 6, the CPU 21 ends the irradiation of the laser light L when the reading of the barcode 201 is completed, and temporarily stores the read code data in the RAM 22.

When the barcode reading is completed, the CPU 21 ends the superimposing display of the guide line GL on the live view image G (Step S8), and then acquires recording-purpose image data of the captured image of the sales slip 200 (Step S9). This acquired image data is temporarily stored in the RAM 22.

Subsequently, the CPU 21 causes the sound emission section 31 to output a buzzer sound, and thereby notifies the user that the image capturing of the sales slip 200 has been completed (Step S10). Then, the CPU 21 causes various acquired data formed of the code data read from the barcode 201 and the image data of the sales slip 200 to be displayed on the display 4 (Step S11). Note that, here, any display mode can be adopted for displaying each piece of the acquired data on the display 4 as long as it allows the user to visually recognize the data.

Thereafter, for example, the CPU 21 causes the acquired data and an instruction request message to be displayed on the display 4, and thereby prompts the user to instruct whether to store the displayed acquired data (Step S12). When an instruction for storing the acquired data is given (YES at Step S12), the CPU 21 stores the acquired data in the storage section 24 (Step S13), and ends one processing in the simultaneous read mode. When an instruction for not storing the acquired data is given (NO at Step S12), the CPU 21 discards (deletes) the temporarily-stored acquired data from the RAM 22 (Step S14), and ends one processing in the simultaneous read mode.

Note that, until the operation mode is changed by the user to a mode different from the simultaneous read mode or the handy terminal is turned off. The CPU 21 performs processing at Steps S13, S14, or S7 and then returns to Step S1 to repeat the subsequent processing.

As described above, in the present embodiment, when the user is to perform a barcode reading operation by using the simultaneous read mode, the guide line GL indicating an assumed irradiation position of the laser light L is displayed on the display screen of the display 4 while being superimposed on the live view image G. This allows the user to know the irradiation position of the laser light L on the display screen of the display 4 even if the user does not directly view the light trail T of the laser light L.

Therefore, even under a bright ambient environment such as outdoors, the adjustment of the irradiation position of the laser light L can be easily performed, and favorable operability can be always ensured without being influenced by an operation environment. Furthermore, concurrently with the operation of adjusting the position and size of the sales slip 200 on the display screen for capturing an image of the sales slip 200, the irradiation position (scanning position) of the laser light L can be adjusted, so that favorable operability can be ensured.

Also, the guide line GL is started to be displayed in response to a pressing operation on the trigger key (center trigger key 5*b* or any of the side trigger keys 5*c*). Therefore, for example, when other information is required to be displayed on the display screen of the display 4 before the trigger key is pressed, the guide line GL does not inhibit the other information, and the display screen can be more effectively utilized.

Furthermore, the display of the guide line GL ends at the time of the completion of a barcode reading operation. As a result of this configuration, the user can be clearly notified of the time of the completion of barcode reading.

Still further, recording-purpose image data of a captured image of the sales slip 200 or the like is automatically acquired at the time of the completion of a barcode reading operation. Therefore, a specific instruction for capturing an image of the sales slip 200 or the like is not required. This configuration improves operation efficiency when a barcode reading operation and an operation for capturing an image of a sales slip or the like are repeatedly performed with many sales slips as targets.

Yet still further, at the time of the completion of image capturing for the sales slip 200, the user is notified of the completion by a buzzer sound. As a result of this configuration, conveniently, the user can clearly know the completion of image capturing. This effect is significant particularly when a barcode reading operation and an operation of capturing an image of a sales slip or the like are repeatedly performed with many sales slips as targets.

Here, in the present embodiment, the guide line GL to be displayed as an indicator indicating an irradiation position of the laser light L on the display screen of the display 4 is a solid line. However, the guide line GL may be a broken line. Also, both ends of the guide line GL may not reach the left and right of the display screen. Furthermore, the indicator indicating an irradiation position of the laser light L may not be a straight solid line, straight broken line, or the like, and can be replaced by, for example, marks such as arrows indicating locations corresponding to both ends of the guide line GL on the left and right of the display screen.

Also, the present embodiment is structured such that the guide line GL is displayed along with the irradiation of the laser light L in response a pressing operation on the trigger key, and then the display of the guide line GL ends at the end of the barcode reading operation. However, for implementation of the present invention, a structure may be adopted in which, when the simultaneous read mode is set, the display of the guide line GL is started simultaneously with the display of a live view display, and continued thereafter.

In that case, for example, if the color of the guide line GL is changed with the progress of the operation, the user can check each operation state of the handy terminal. In one specific example when the color of the guide line GL is changed, the color of the laser light L before irradiation is set as "green", the color of the laser light L during the irradiation (during barcode reading operation) is set as "red", and then the color is returned to "green" after the end of the barcode reading operation.

While the present invention has been described with reference to the preferred embodiments, it is intended that the invention be not limited by any of the details of the description therein but includes all the embodiments which fall within the scope of the appended claims.

What is claimed is:

1. A barcode reading device comprising:
a barcode scanner which irradiates a target with a light beam and reads a barcode provided to the target;
a camera which captures an image of the target;
a display which sequentially displays images captured by the camera; and
a processor which performs indicator display control processing of causing an indicator indicating an assumed irradiation position of the light beam to be displayed on the display while being superimposed on the captured image when the barcode is read by the barcode scanner,
wherein the indicator display control processing causes the indicator to be displayed on the display while being superimposed on the captured image substantially simultaneously with a start of a barcode reading operation by the barcode scanner.

2. The barcode reading device according to claim 1, wherein the indicator display control processing ends display of the indicator on the display when the barcode reading operation by the barcode scanner is completed.

3. The barcode reading device according to claim 1, wherein the indicator is a straight line having a predetermined width.

4. A barcode reading device comprising:
a barcode scanner which irradiates a target with a light beam and reads a barcode provided to the target;
a camera which captures an image of the target;
a display which sequentially displays images captured by the camera; and
a processor which performs indicator display control processing of causing an indicator indicating an assumed irradiation position of the light beam to be displayed on the display while being superimposed on the captured image when the barcode is read by the barcode scanner,
wherein the indicator display control processing causes the indicator to be displayed on the display while being superimposed on the captured image in response to an instruction for starting a barcode reading operation from a user.

5. The barcode reading device according to claim 4, wherein the processor performs image control processing of causing the camera to capture a recording-purpose image upon completion of the barcode reading operation by the barcode scanner.

6. A barcode reading device comprising:
a barcode scanner which irradiates a target with a light beam and reads a barcode provided to the target;
a camera which captures an image of the target;
a display which sequentially displays images captured by the camera; and
a processor which performs indicator display control processing of causing an indicator indicating an assumed irradiation position of the light beam to be displayed on the display while being superimposed on the captured image when the barcode is read by the barcode scanner,
wherein the processor performs image control processing of causing the camera to capture a recording-purpose image upon completion of a barcode reading operation by the barcode scanner.

7. The barcode reading device according to claim 6, further comprising:
a buzzer which notifies completion of capturing of the recording-purpose image by the camera.

8. A control method for a barcode reading device including a barcode scanner which irradiates a target with a light beam and reads a barcode provided to the target, a camera which captures an image of the target, a display which sequentially displays images captured by the camera, and a processor, the method comprising:
- an indicator display control step of causing an indicator indicating an assumed irradiation position of the light beam to be displayed on the display while being superimposed on the captured image when the barcode is read by the barcode scanner,
- wherein the indicator display control step causes the indicator to be displayed on the display while being superimposed on the captured image substantially simultaneously with a start of a barcode reading operation by the barcode scanner.

9. The control method according to claim 8, wherein the indicator display control step ends display of the indicator on the display when the barcode reading operation by the barcode scanner is completed.

10. The control method according to claim 8, wherein the indicator is a straight line having a predetermined width.

11. A control method for a barcode reading device including a barcode scanner which irradiates a target with a light beam and reads a barcode provided to the target, a camera which captures an image of the target, a display which sequentially displays images captured by the camera, and a processor, the method comprising:
- an indicator display control step of causing an indicator indicating an assumed irradiation position of the light beam to be displayed on the display while being superimposed on the captured image when the barcode is read by the barcode scanner,
- wherein the indicator display control step causes the indicator to be displayed on the display while being superimposed on the captured image in response to an instruction for starting a barcode reading operation from a user.

12. A non-transitory computer-readable storage medium having stored thereon a program that is executable by a computer of a barcode reading device including a barcode scanner which irradiates a target with a light beam and reads a barcode provided to the target, a camera which captures an image of the target, a display which sequentially displays images captured by the camera, and a processor, the program being executable by the computer to actualize functions comprising:
- indicator display control processing for causing an indicator indicating an assumed irradiation position of the light beam to be displayed on the display while being superimposed on the captured image when the barcode is read by the barcode scanner,
- wherein the indicator display control processing causes the indicator to be displayed on the display while being superimposed on the captured image substantially simultaneously with a start of a barcode reading operation by the barcode scanner.

13. The computer-readable storage medium according to claim 12, wherein the indicator display control processing ends display of the indicator on the display when the barcode reading operation by the barcode scanner is completed.

14. The computer-readable storage medium according to claim 12, wherein the indicator is a straight line having a predetermined width.

15. A non-transitory computer-readable storage medium having stored thereon a program that is executable by a computer of a barcode reading device including a barcode scanner which irradiates a target with a light beam and reads a barcode provided to the target, a camera which captures an image of the target, a display which sequentially displays images captured by the camera, and a processor, the program being executable by the computer to actualize functions comprising:
- indicator display control processing for causing an indicator indicating an assumed irradiation position of the light beam to be displayed on the display while being superimposed on the captured image when the barcode is read by the barcode scanner,
- wherein the indicator display control processing causes the indicator to be displayed on the display while being superimposed on the captured image in response to an instruction for starting a barcode reading operation from a user.

16. A control method for a barcode reading device including a barcode scanner which irradiates a target with a light beam and reads a barcode provided to the target, a camera which captures an image of the target, a display which sequentially displays images captured by the camera, and a processor, the method comprising:
- an indicator display control step of causing an indicator indicating an assumed irradiation position of the light beam to be displayed on the display while being superimposed on the captured image when the barcode is read by the barcode scanner; and
- an image control step of causing the camera to capture a recording-purpose image upon completion of a barcode reading operation by the barcode scanner.

17. A non-transitory computer-readable storage medium having stored thereon a program that is executable by a computer of a barcode reading device including a barcode scanner which irradiates a target with a light beam and reads a barcode provided to the target, a camera which captures an image of the target, a display which sequentially displays images captured by the camera, and a processor, the program being executable by the computer to actualize functions comprising:
- indicator display control processing for causing an indicator indicating an assumed irradiation position of the light beam to be displayed on the display while being superimposed on the captured image when the barcode is read by the barcode scanner; and
- image control processing for causing the camera to capture a recording-purpose image upon completion of a barcode reading operation by the barcode scanner.

* * * * *